United States Patent
Wilhelm, Jr.

(10) Patent No.: US 6,910,211 B1
(45) Date of Patent: Jun. 21, 2005

(54) SYSTEM AND METHOD FOR QUEUE-LESS ENFORCEMENT OF QUEUE-LIKE BEHAVIOR ON MULTIPLE THREADS ACCESSING A SCARCE SOURCE

(75) Inventor: George William Wilhelm, Jr., Endwell, NY (US)

(73) Assignee: International Business Machines Corporation, Armonk, NY (US)

(*) Notice: Subject to any disclaimer, the term of this patent is extended or adjusted under 35 U.S.C. 154(b) by 1139 days.

(21) Appl. No.: 08/820,181

(22) Filed: Mar. 14, 1997

(51) Int. Cl.[7] .................................................. G06F 9/00
(52) U.S. Cl. ...................... 718/104; 718/107; 718/102
(58) Field of Search ................................ 718/100, 102, 718/104, 107, 108; 709/100, 101, 107, 103, 104, 106, 108

(56) References Cited

U.S. PATENT DOCUMENTS

| | | | |
|---|---|---|---|
| 4,642,756 A | 2/1987 | Sherrod | 364/200 |
| 4,658,351 A | 4/1987 | Teng | 364/200 |
| 5,109,511 A | 4/1992 | Nitta et al. | 395/650 |
| 5,179,702 A | 1/1993 | Spix et al. | 395/650 |
| 5,305,455 A | 4/1994 | Anschuetz et al. | 395/700 |
| 5,404,521 A | 4/1995 | Murray | 395/650 |
| 5,414,856 A | 5/1995 | Yokota | 395/725 |
| 5,450,592 A | 9/1995 | McLeod | 395/650 |
| 5,452,452 A | 9/1995 | Gaetner et al. | 395/650 |
| 5,630,136 A * | 5/1997 | Davidson et al. | 709/102 |
| 5,644,768 A * | 7/1997 | Periwal et al. | 709/106 |

* cited by examiner

*Primary Examiner*—Majid Banankhah
(74) *Attorney, Agent, or Firm*—Shelley M Beckstrand

(57) ABSTRACT

A system and method for managing simultaneous access to a scarce or serially re-usable resource by multiple process threads. A stationary queue is provided, including a wait counter for counting the cumulative number of threads that have been temporarily denied the resource; a satisfied counter for counting the cumulative number of threads that have been denied access and subsequently granted access to said resource; a sleep code routine responsive to the wait counter for generating a run identifier; and a wakeup code routine responsive to the satisfied counter for generating the run identifier.

3 Claims, 3 Drawing Sheets

SYSTEM AND METHOD FOR QUEUE-LESS ENFORCEMENT OF QUEUE-LIKE BEHAVIOR ON MULTIPLE THREADS ACCESSING A SCARCE SOURCE

BACKGROUND OF THE INVENTION

1. Technical Field of the Invention

This invention relates to a method and system for managing shared resources, and more particularly to a stationary queue for managing access to scarce or serially reusable resources by multiple process threads.

2. Background Art

Hardware device drivers that support multi-tasking operating systems must cope with the challenge of managing simultaneous access to scarce or serially re-useable resources by multiple program entities, also referred to as process threads.

When a thread requests access to a resource that is unavailable, and outright rejection of the request is not allowed, the thread must be suspended until the resource becomes available (is freed by whatever other process is currently using it). Fairness is usually important. That is, requests for the resource should be honored in the order in which they were received.

Solutions to this problem are plentiful, but involve manipulating data structures such as first in first out (FIFOs) buffers or linked lists for managing the queuing of requests and honoring them in the order in which the occur. Such approaches are often unnecessarily complex or wasteful of either CPU cycles or memory (or both) for certain classes of this problem.

Thus, the problem of resource management has typically been solved in one of two ways: (1) free-for-all waking of any and all threads waiting for the scarce resource; or, (2) maintaining a queue structure, typically in the form of a linked list or a FIFO, to enforce order and to enable waking one thread at a time.

If multiple threads are all awakened when a single resource instance becomes available, then only one thread will be satisfied and the others will have to go to sleep (wait) again. This causes excessive churn on the system's process (or thread) run queue. Further, the free-for-all waking of all threads at once does nothing to enforce "fairness". There is, consequently, a need in the art for a method and system which is more efficiently uses system CPU resources.

In order to maintain any form of linked list structure (the classical method of queuing objects of any sort) or a first in first out (FIFO) buffer, ancillary structures must be consulted or additional memory references made in order to create the wake-up ID for the next thread in line. This requires both resources and time. There is, consequently, a need in the art for a method and system which are far faster and use less memory.

It is an object of the invention to efficiently share a scarce resource among multiple program entities (threads), and to do so with minimal CPU usage and negligible memory overhead.

It is a further object of the invention to wake waiting threads, one at time, in the exact order in which they began waiting for the resource, while minimizing system churn and guaranteeing fairness.

It is a further object of the invention to manage such resources by maintaining two counters, wherein the counters themselves not only indicate the presence (and number) of waiting threads, but contain all information necessary to wake the threads in order, one at a time.

SUMMERY OF THE INVENTION

In accordance with the invention, a system and method are provided for managing simultaneous access to scarce or serially re-usable resources by multiple process threads comprising a stationary queue.

In accordance with the method of the invention, a sleep code routine generates a unique block identifier when a process thread temporarily cannot gain access to the resource and must be suspended; and a wakeup code routine generates a unique run identifier when a next thread in line is reanimated and granted access to the resource.

In accordance with the system of the invention, a wait counter is provided for counting the cumulative number of threads that have been temporarily denied the resource; a satisfied counter is provided for counting the cumulative number of threads that have been denied access and subsequently granted access to said resource; a sleep code routine is responsive to the wait counter for generating a run identifier; and a wakeup code routine is responsive to the satisfied counter for generating the run identifier.

Other features and advantages of this invention will become apparent from the following detailed description of the presently preferred embodiment of the invention, taken in conjunction with the accompanying drawings.

BEST MODE FOR CARRYING OUT THE INVENTION

In accordance with this invention, the solution to this scarce resource management problem produces the same result as a queue or FIFO, but there is no memory actually associated with the queue or FIFO structure. No data or identifiers are moved into or out of this queue, hence the term 'stationary'. Only the read and write pointers of the queue need be maintained since the data that would ordinarily be stored in the queue is impliedly the counter, or pointer, values themselves.

Figure 1:
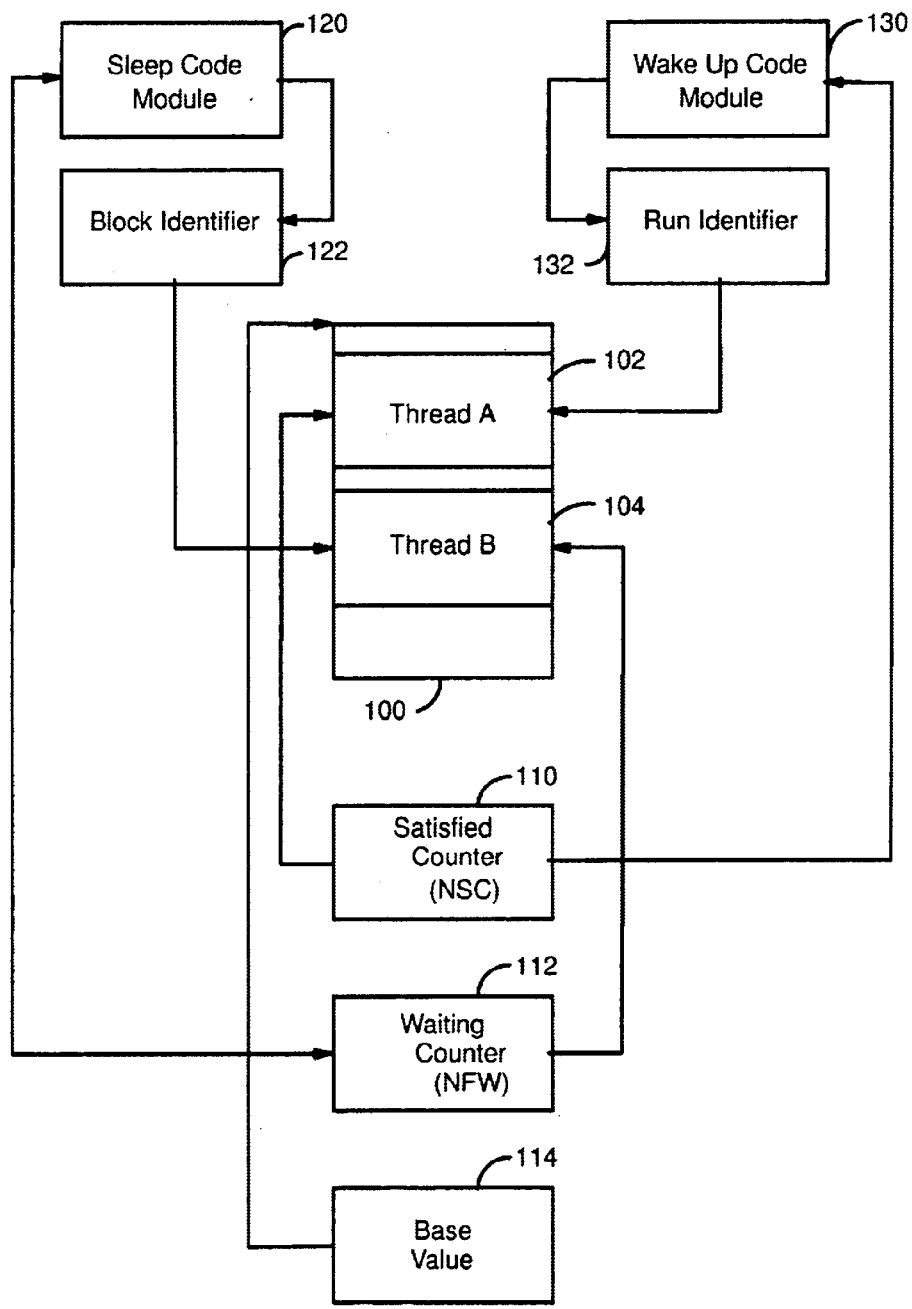
FIG. 1 illustrates the programming structures for implementing the system and method of the invention.

Referring to FIG. 1, to solve this problem in an efficient manner requires two brief sections of code:

1) Sleep Code 120

This routine generates a unique 'Block ID' 122 when a process thread 104 temporarily cannot gain access to a scarce or serially reusable resource and must be suspended.

2) Wakeup Code 130

This routine generates Run IDs 132 in the same order as the Block Ids 122 so that, when the contested resource becomes available, the next thread 102 in line is reanimated and granted access to the resource.

Multi-tasking operating systems provide system calls to perform the sleep and wakeup operations. A block command puts a thread to sleep with a unique identifier which may be used to awaken the thread. For example, in the IBM OS/2 operating system, device drivers, or system calls, DevHlp__ProcBlock and DevHlp__ProcRun, respectively, have the capability of choosing block and run identifiers.

In addition to the code fragments 120, 130, two companion counter variables 110, 112 are required as defined below. These counters may be any length (8-bit, 16-bit, etc.) large enough to accommodate the maximum number of outstanding queued requests for the resource in question, and they must be the same length.

1) number_forced_to_wait (NFW) 112

This counter 112 is a cumulative counter of the number of threads that have been temporarily denied the resource. The initial value of this counter is zero (0). It is incremented whenever a thread 102 is denied access to the resource and is forced to wait or sleep until it becomes available. When this counter is incremented past its maximum value, it rolls over to zero.

2) number_satisfied (NSC) 110 This counter 110 is a cumulative counter of the number of threads 102 that have been first forced to wait and have been subsequently satisfied in their demand to access the scarce resource. The initial value of this counter is zero (0). Whenever a thread exits the head of the line 100 and is granted access to the resource, NSC counter 110 is incremented. When NSC counter 110 is incremented past its maximum value, it rolls over to zero.

Whenever the number_forced_to_wait (NFW) counter 112 is exactly equal to the number_satisfied (NSC) 110 counter, then there are no threads 100 waiting for the resource, and no wakeup calls must be made. However, when these counters 110, 112 are not equal, then there are threads 102, 104 waiting in the stationary queue 110, 112, 114 for access to the scarce resource, and a wakeup call must be issued whenever a resource becomes available. The queuing (sleeping) and dequeuing (awakening) operations are depicted in the following sections.

Figure 2:
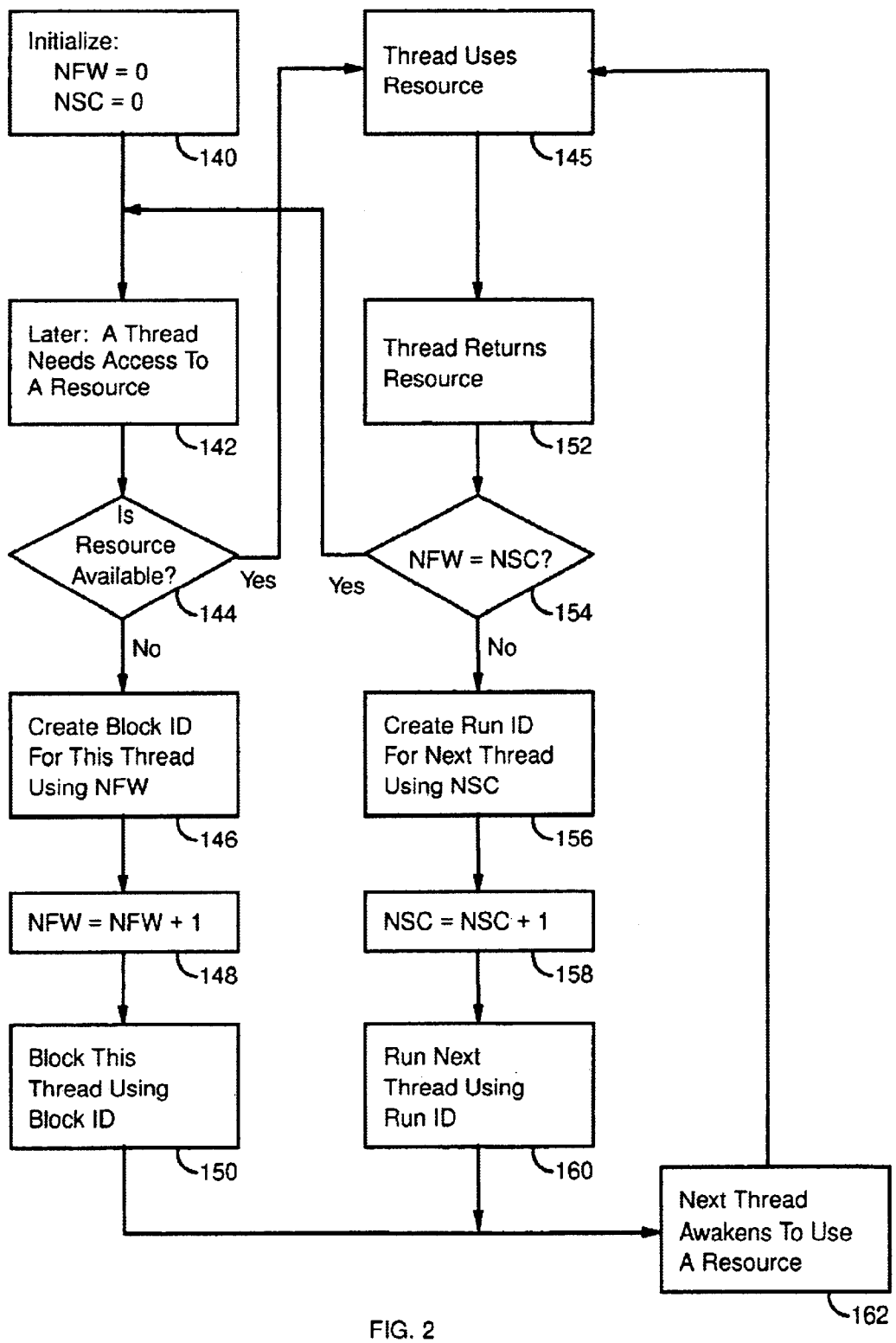
FIG. 2 is a flow diagram representation of the pseudo code statement of the method of the invention of Tables 1 and 2.

In both sections (below), reference is made to creating a Block ID 122 or Run ID 132 using one of the two stationary queue counters 110, 112. This refers to creating a number of the proper length for use by the Sleep (Block) function 120 or Wakeup (Run) function 130 for the target operating system. For example, in the OS/2 operating system, Block/Run Ids 122, 132 are 32 bit values. Further, they must be distinct from those used for other purposes of the same device driver or by other device drivers in the system. To accomplish the latter requirement, OS/2 device drivers typically use their own code or data addresses as the base 114 for forming a Block/Run ID 122, 132. Thus, in the program flows below, 'Create a Block ID' refers to the process of adding the appropriate counter's 110, 112 value to a given base number 114, the selection of which is not germane to this invention. Referring to FIG. 2, the procedure for adding a thread 102 to the stationary queue is set forth in Table 1, and the procedure for removing a thread 104 from the stationary queue is set forth in Table 2. In step 140, number_forced_to_wait counter (NFW) 112 and number_satisfied counter (NSC) 110 are initialized to zero. Upon receiving a request for a resource in step 142, in step 144 the determination is made if the resource is available. If the resource is not available, in step 146 a block ID 122 is 10 created using NFW 112, NFW 112 is incremented in step 148, and the thread is blocked in step 150 to await a wake-up call at step 162, in which the run ID 132 is equal to the block ID with which it was put to sleep in step 150.

If, in step 144, it is determined that the requested resource is available, in step 145 the thread uses the resource and, when finished, in step 152 returns the resource. In step 154 it is determined whether or not NFW counter 112 equals NSC counter 110. If they are equal, there are no threads waiting on the resource, and processing returns to step 142 to await a request from a thread for the resource. If they are not equal, there is a waiting thread. In step 156, run ID 132 is created using the value of NSC 110 counter, which will then be incremented in step 156. In step 160, the thread identified by run ID 132 is awakened and made ready to run by the operating system. In step 162, that thread awakens, and in step 145, uses the resource.

Figure 3:
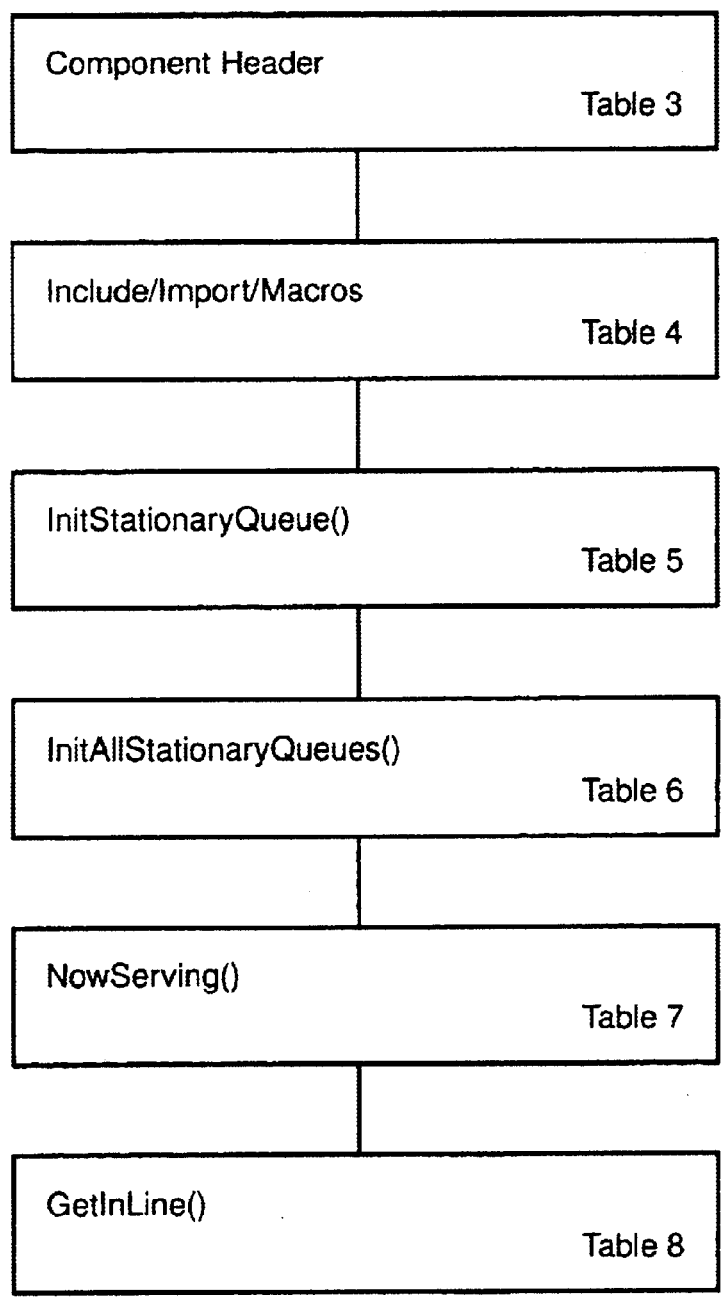
FIG. 3 is a flow diagram showing the program structure of Tables 3–8 implementing the system and method of the invention.

Referring to FIG. 3 in connection with Tables 3–8, a more detailed description of a preferred embodiment of the invention is set forth.

TABLE 1

Add Thread

```
IF the resource is unavailable THEN DO
    Create a Block ID using the number_forced_to_wait counter
    Increment the number_forced_to_wait counter
    Block this thread using the Block ID just created
        /* At this point this thread of execution is          */
        /* suspended, waiting for its unique wake-up call.    */
        /* When wake-up call comes, execution resumes at      */
        /* this point.                                        */
END
```

The resource is now available, and the thread commences using it.

TABLE 2

Remove Thread

```
IF number_forced_to_wait is NOT EQUAL TO number_satisfied
    THEN DO
        Create a Run ID using the number-satisfied counter
        Increment the number-satisfied counter
        Run the thread using the Run ID just created
        /* At this point, the process thread that has been  */
        /* waiting in the stationary queue the longest is   */
        /* made ready to run by the operating system.       */
END
```

TABLE 3

Component Header

```
/
*   COMPONENT NAME: statq.c
*
*       DESCRIPTION: Generic function for implementing a
*       delicatessen-style queuing mechanism - lightweight and
*       fast.
*
*       REFERENCES: Physical Device Driver Reference for OS/2
*       (S10G-6266-01)
*
*       FUNCTIONS: InitStationaryQueue( )
*       InitAllStationaryQueues( )
*       NowServing( )
*       GetInLine( )
*
*   ORIGINS:
*
*   (C) COPYRIGHT International Business Machines Corp., 1995
*   All Rights Reserved
*   Licensed Materials - Property of IBM
*
*/
```

TABLE 4

Include/Import/Local Macros

```
/*
 *   This structure defines a "stationary queue".
 *   This queue is a lightweight, delicatessen-style, serialization
 *       mechanism that enforces orderly access to a scarce resource.
 *   Threads requesting access to a resource "take a number".
 *   As their numbers are called, the threads are awakened.
 *   The base value of the queue is a unique virtual address in
 *       our data storage.
 *   Multiple queues must have unique base values separated by at
 *       least the queue size (which is 256).
 *   The queue can hold at most 255 customers. No checking is
 *       performed to enforce this in this embodiment.
 */
struct STATIONARY_Q {
    ULONG  base;   /* base value for forming Block/Run Ids      */
    UCHAR  next;   /* aka number_satisfied_counter, or NSC      */
    UCHAR  last;   /* aka number_forced_to_wait counter, or NFW */
};
/*
 *   IMPORTED FUNCTIONS/DATA:
 */
extern struct ACB;
#endif               /* _AIX                                    */
/*
 *   LOCAL MACROS:
 */
#define  QUEUE_SIZE   256           /* default max size         */
#define  STATIONARY_Q_BASE  ((ULONG)((char far *) &acb))
                                    /* arbitrary q base guaranteed to be
                                       in our data seq         */
```

TABLE 5

InitStationaryQueue( )

```
/*
 *   InitStationaryQueue( )
 *
 *   This function initializes a single stationary queue
 *       structure.
 *   If the given base is non-zero, it is used.
 *   Otherwise, the base used is the virtual address of the ACB
 *       structure.
 *   The base used is incremented by the QUEUE_SIZE and returned
 *       to the caller for use on subsequent calls.
 *   It is anticipated that this routine will be called multiple
 *       times to initialize multiple queues (the design assumption
 *       here is that a queue of size 256 suffices).
 */
ULONG
M_InitStationaryQueue
    (
    AIX_ACB_PARM  /* Parameter for AIX only - DO NOT follow
                                       with a comma            */
    int       queue_number,
    ULONG     base
    )
{
    struct STATIONARY_Q *pq;
    pq = &acb.stationary_q[queue_number];
    if (base == 0L)
        base = STATIONARY_Q_BASE;
    pq->base = base;
    pq->next =
    pq->last = 0;
    base += QUEUE_SIZE;
    return( base );
}                    /* end of InitStationaryQueue( )          */
```

TABLE 6

InitAllStationaryQueues( )

```
/*
 *   InitAllStationaryQueues( )
 *
 *   This function initializes all stationary queue objects for
 *       the DD.
 *   The assumption here is that they *all* are the same size.
 *   The q_base argument to InitStationaryQueue is set to ZERO the
 *       first time through to indicate that this is the first queue
 *       initialized.
 *   Thereafter, the previous return value from
 *       InitStationaryQueue is fed back to cause the queue ranges
 *       to be sequential and not overlapping.
 */
void
M_InitAllStationaryQueues
    (
    AIX_VOID_PARM
    )
{
    ULONG    q_base;
    int      q;
    q_base = 0L;
    for ( q = 0 ; q < NUM_QUEUES ; ++q )
        q_base = InitStationaryQueue( q, q_base );
    return;
}                    /* end of InitAllStationaryQueues( )      */
```

TABLE 7

NowServing( )

```
/*
 *   NowServing( )
 *
 *   This function calls the next number of a thread sleeping in
 *       the stationary queue.
 *   A function relinquishing a scarce resource will call this
 *       routine.
 *   Since some threads may have awakened prematurely (timed out)
 *       and may no longer be holding a number, this function should
 *       continue to call outstanding numbers until some thread
 *       responds or the queue is empty.
 */
void
M_NowServing
    (
    AIX_ACB_PARM  /* Parameter for AIX only - DO NOT follow
                                       with a comma            */
    int   queue_number
    )
{
    struct STATIONARY_Q *pq;  /* pointer to the queue of interest */
    int    num_threads_woke;
    pq = &acb.stationary_q[queue_number];
    /*
     *   While there are numbers left to call, call the next in line
     *       until someone answers or the queue is emptied.
     */
    while (pq->next != pq->last) {
        num_threads_woke = Run( ++pq->next + pq->base );
        if (num_threads_woke > 0)
            break;
    }
    return;
}                    /* end of NowServing( )                   */
```

TABLE 8

GetInLine( )

```
/*
 *   GetInLine( )
```

TABLE 8-continued

GetInLine( )

```
*
*   This routine places a thread in the stationary queue.
*   If a thread wants a scarce resource that is not available, it
*       calls this routine to get in line for the resource.
*   Basically, the thread uses this function to "take a number".
*   When the number is called, this thread awakens.
*
*   It is assumed that interrupts are DISABLED before getting
*       here so that the wake-up call (Run) does not precede our
*       wait (Block).
*   Interrupts are re-DISABLED upon return from Block.
*
*   The return value from Block is passed back out to the caller.
*/
int
M_GetInLine
    (
    AIX_ACB_PARM  /* Parameter for AIX only - DO NOT follow
                                 with a comma                       */
    int   queue_number
    )
{
    struct STATIONARY_Q *pq;  /* pointer to the queue of interest */
    int    rc;
    pq = &acb.stationary_q[queue_number];  /* access the desired
                                                queue          */
    /*
     *  Get in at the end of the line. Bump the last counter (take
     *      a number) and sleep on the number taken.
     */
    rc = Block( ++pq->last + pq->base, -1, INTERRUPTIBLE );
    return( rc );
}                           /* end of GetInLine( )    */
                            /* end of statq.c         */
```

Advantages Over the Prior Art

It is an advantage of the invention that it provides an apparatus and method applicable to any device driver design that serves multiple processes, and to application programs that utilize multiple threads accessing common (shared) scarce resources, such as is the case with device drivers or application programs for multi-tasking operating system, such as OS/2, AIX, UNIX, and Windows 95.

The problem of resource management has typically been solved in one of two ways: (1) free-for-all waking of any and all threads waiting for the scarce resource; or, (2) maintaining a queue structure, typically in the form of a linked list or a FIFO, to enforce order and to enable waking one thread at a time.

The advantage provided by the invention with respect to the first alternative listed above is that it more efficiently uses system CPU resources. If multiple threads are all awakened when a single resource instance becomes available, then only one thread will be satisfied and the others will have to go to sleep (wait) again. This causes excessive churn on the system's process (or thread) run queue. Further, the free-for-all waking of all threads at once does nothing to enforce "fairness". The method and apparatus of the invention wakes waiting threads, one at time, in the exact order in which they began waiting for the resource, minimizing system churn and guaranteeing fairness.

The advantage provided by the invention with respect to the second alternative listed above is that it is far simpler to maintain two trivial counters than to maintain any form of linked list structure (the classical method of queuing objects of any sort) or a first in first out (FIFO) buffer. The counters themselves not only indicate the presence (and number) of waiting threads, but contain all information necessary to wake the threads in order, one at a time. No ancillary structures need be consulted nor additional memory references made in order to create the wake-up ID for the next thread in line. Thus, the method and apparatus of the invention are far faster and use less memory.

Alternative Embodiments

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

I claim:

1. A multi-tasking operating system stationary queue for managing simultaneous access to scarce or serially re-usable resources by multiple process threads, the stationary queue comprising:

a sleep code routine for generating a unique block identifier when a process thread temporarily cannot gain access to said resource and must be suspended; and a wake-up code routine for generating a unique run identifier when a next thread in line is to be re-animated and granted access to said resource in FIFO order.

2. The system of claim 1, further comprising:

a wait counter for counting the cumulative number of threads that have been temporarily denied the resource;

a satisfied counter for counting the cumulative number of threads that have been denied access and subsequently granted access to said resource;

said sleep code routine being responsive to said wait counter for generating said run identifier; and said wake-up code routine being responsive to said satisfied counter for generating said run identifier.

3. A memory device for storing signals to structure the components of a digital computer to form a stationary queue for managing simultaneous access to scarce or serially re-usable resources by multiple process threads, comprising:

a sleep code routine for generating a unique block identifier when a process thread temporarily cannot gain access to said resource and must be suspended;

a wake-up code routine for generating a unique run identifier when a next thread in line is to be re-animated and granted access to said resource;

await counter for counting the cumulative number of threads that have been temporarily denied the resource;

a satisfied counter for counting the cumulative number of threads that have been denied access and subsequently granted access to said resource;

said sleep code routine being responsive to said wait counter for generating said run identifier; and said wake-up code routine being responsive to said satisfied counter for generating said run identifier.

* * * * *